United States Patent Office 3,528,025
Patented Sept. 8, 1970

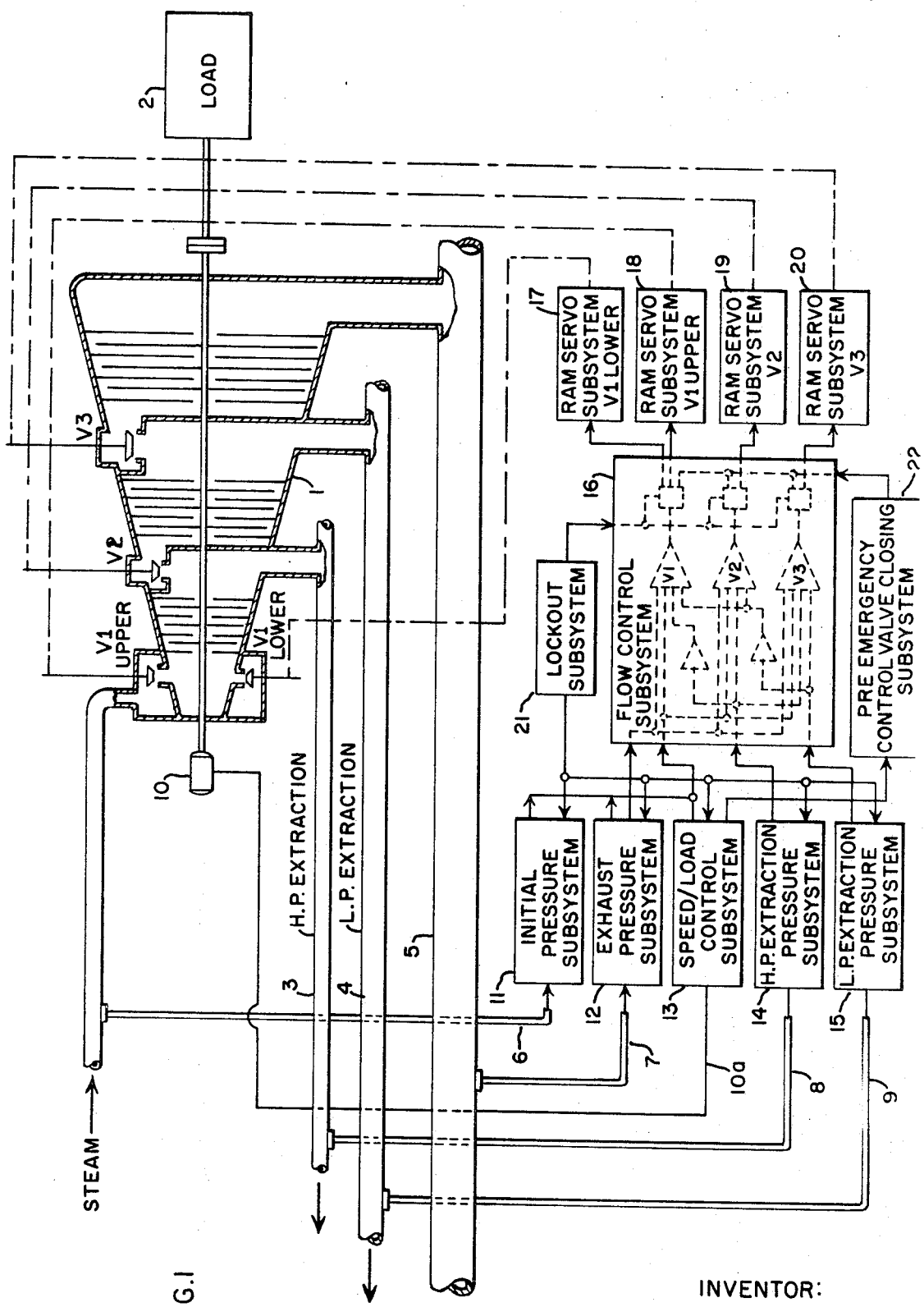

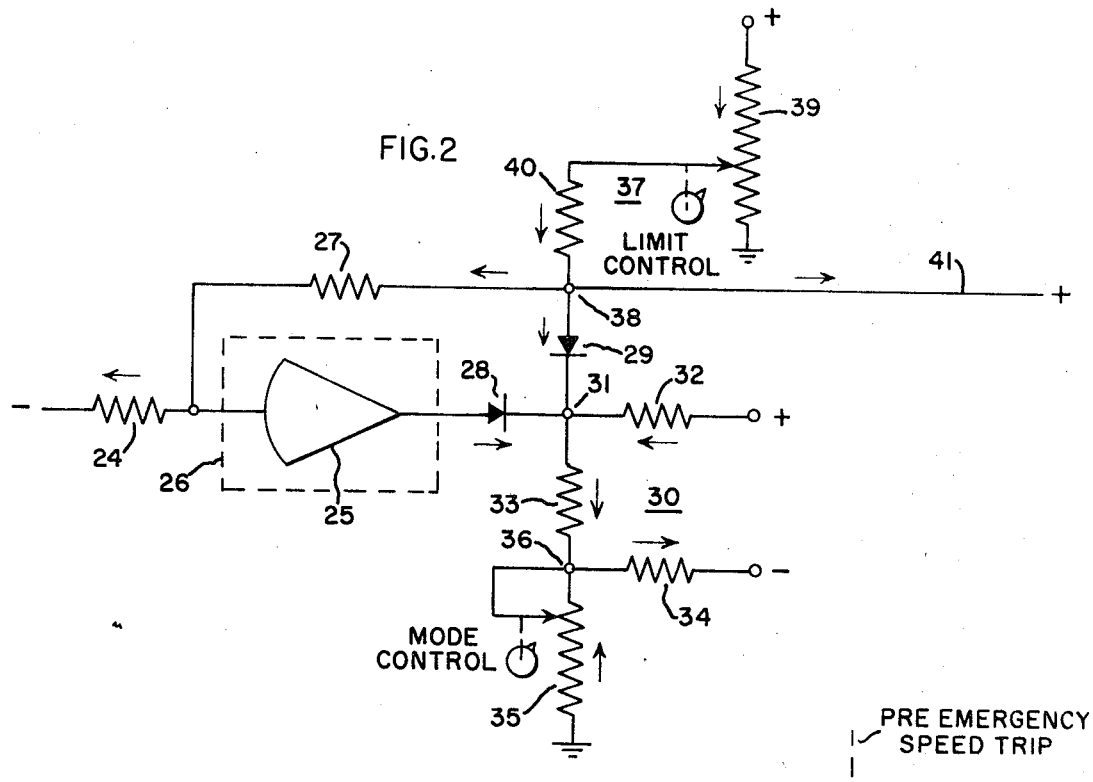
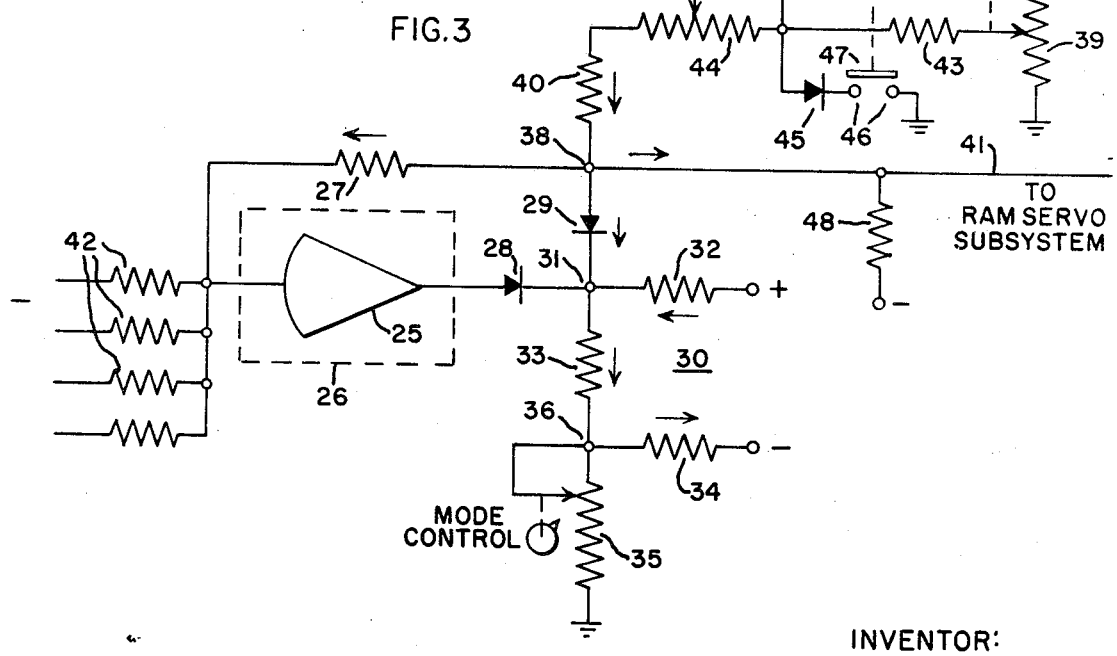

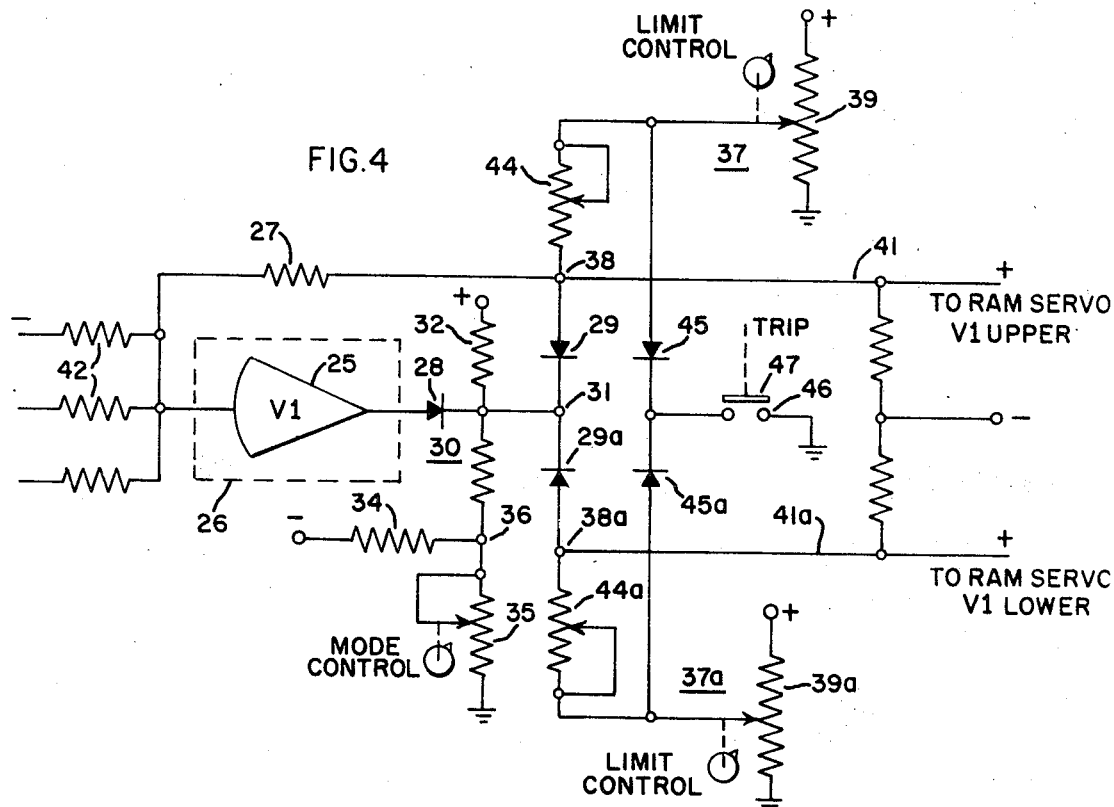
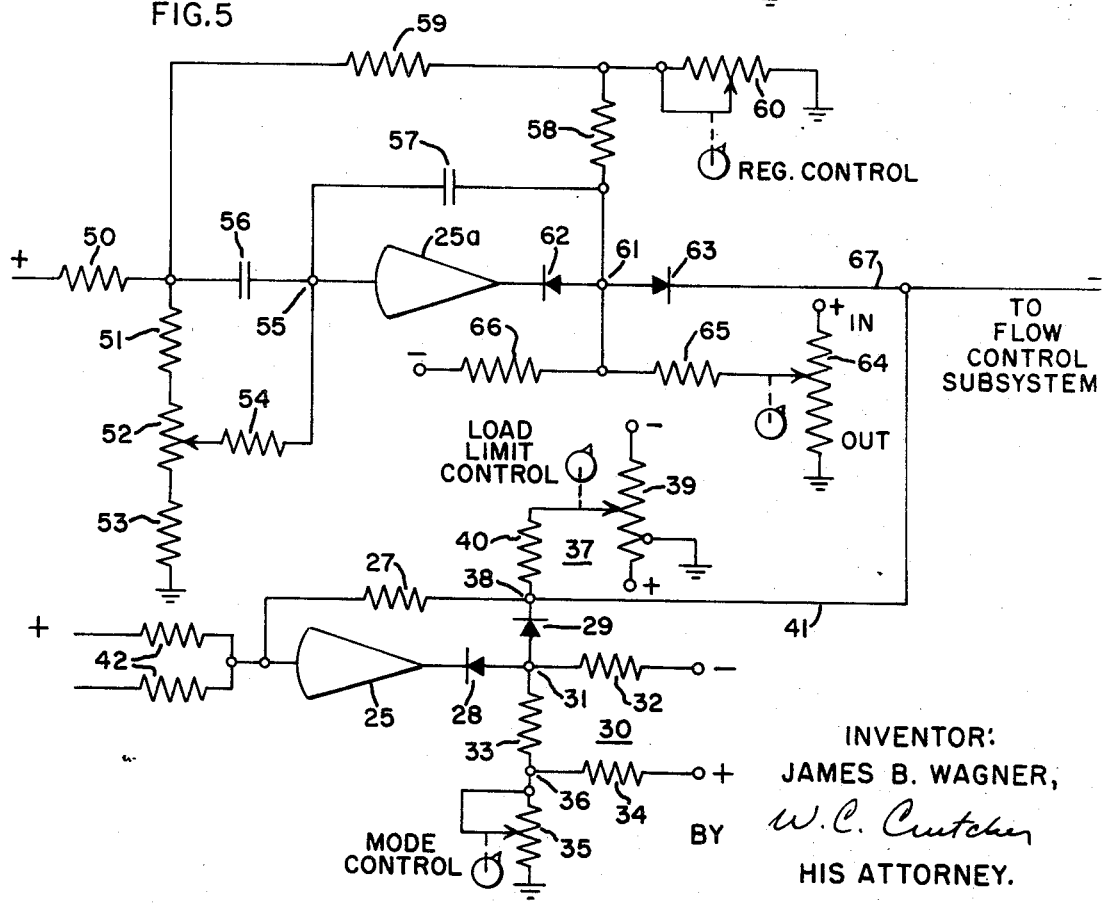

1

3,528,025
CONTROL AMPLIFIER WITH PROVISION FOR ALTERNATE CONTROLS
James B. Wagner, Lynnfield, Mass., assignor to General Electric Company, a corporation of New York
Filed May 14, 1968, Ser. No. 728,960
Int. Cl. H03f *3/00;* G06g *7/12*
U.S. Cl. 330—192                              5 Claims

ABSTRACT OF THE DISCLOSURE

An electrohydraulic control system for a turbine employs operational amplifiers to perform various functions including positioning the steam valves, with provisions for manual valve control during removal for maintenance of one or more amplifiers and providing additional overspeed protection during maintenance.

BACKGROUND OF THE INVENTION

Control systems for prime movers have been developed of a type known as electrohydraulic, wherein solid state operational amplifiers serve to perform complex signal manipulation in accordance with various operating conditions of the turbine, the output from the amplifiers then serving to position the steam valves through high pressure hydraulic ram servo systems.

One of the needs which can arise in such a system is the need to service a part of the electronic portion of the control system without shutting down operation of the prime mover. A frequently used electronic component of the system is the DC high gain operational amplifier used to perform various functions such as summation, integration, sign reversal, etc. Although such amplifiers and their associated circuits have been developed to a point where they are relatively reliable, nevertheless they must occasionally be replaced. It is desirable to continue to operate the turbine with provision for manual control of one or more valves during such replacement, while the rest of the control system continues to operate, although perhaps in imperfect fashion.

Another requirement of the system is to prevent damage to the prime mover through overspeed. Although turbines have "emergency" valves which are operated by a very reliable mechanical overspeed trip mechanism, they also have a second line of overspeed defense using the "control" valves. It is desirable to be able to close the control valves in advance of an emergency overspeed condition while they are being serviced. Therefore, various suggestions have been made for sensing a "preemergency" speed and closing the control valves before a real emergency exists. It is desirable that such preemergency valve closing provisions be operative whether the turbine is actively under control of the electrohydraulic control system, or whether one or more of the control valves is under manual control during maintenance, as mentioned previously, while the system is being serviced.

Accordingly, one object of the present invention is to provide an improved control circuitry with provision for alternate control of the controlled device.

Another object of the invention is to provide an improved turbine control system of the electrohydraulic type with provision for manual control of the valves while portions of the control system are out of service.

Still another object of the invention is improved turbine control system of the electrohydraulic type with provision for preemergency control valve closing in the event of overspeed, even under conditions of partially operative amplifiers.

2

SUMMARY OF THE INVENTION

Briefly stated, the invention is practiced by providing a system for actuating a controlled device, either in accordance with the input signal to an amplifier circuit or in accordance with an alternate overriding signal. The system includes a pair of opposed diodes in circuit with an operational amplifier and variable potential current sources connected to either side by one of the diodes, so as to provide means to selectively back-bias the diodes. One of the variable potential current sources serves to shift the mode of control, while the other serves to determine the overriding output to the controlled device.

DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a simplified schematic diagram of a double extraction steam turbine with initial pressure and exhaust pressure control which is illustrative of an environment in which the invention may be practiced in various forms, FIG. 2 is a simplified circuit diagram of one form of the invention when used as a proportional amplifier with simple lockout control.

FIG. 3 is a summing operational amplifier with provision for manual positioning during lockout and also preemergency overspeed protection during lockout or otherwise, FIG. 4 is a summing amplifier with provision for controlling two output devices with separate manual positioning of either during lockout and also overspeed protection for both devices, and FIG. 5 is an arrangement of two amplifiers with separate inputs controlling a single output device and having lockout feature for one amplifier independently of the other.

DESCRIPTION OF THE PREFERRED EMBODIMENT

Referring to FIG. 1 of the drawing, a simplified diagram of an electrohydraulic control system for a double extraction steam turbine is illustrated for the purpose of showing the general environment in which the invention might be employed. The steam turbine 1 is connected to drive a load 2 and also to supply process steam at various pressure levels via lines 3, 4, 5.

Provision is made for sensing a number of turbine operating conditions such as initial steam pressure via line 6, turbine exhaust pressure via line 7, high pressure extraction pressure via line 8, low pressure extraction pressure via line 9. Turbine speed is sensed via line 10a connected to a permanent magnet generator 10.

The various operating conditions are converted to equivalent signal voltages and compared with operating set points in the various subsystems numbered 11–15. The resultant signals serve to modify one another in the flow control subsystem 16, the output of which is in terms of electrical voltages representing desired valve positions.

The valve position signals are applied to ram servo subsystems labeled 17–20. The ram servo subsystems serve to position steam valves labeled V1 lower, V1 upper, V2 and V3 so as to satisfy the required operating conditions, or in lieu thereof to satisfy one or more conditions deemed to have preference.

The details of the foregoing subsystems 11–20 are not material to the present invention, but examples of the foregoing may be seen by reference to U.S. Pats. 3,064,435; 3,091,933; and 3,233,413 assigned to the present assignee.

In accordance with the invention, the subsystems 11–16 all incorporate, at various places, amplifiers and associated circuitry which it is desired to replace or maintain while the remainder of the system is in operation. This is enabled by a lockout or mode control subsystem 21.

Also it is desired that preemergency closing of the valves take place despite the condition of the control system if a predetermined speed is exceeded. This is accomplished by a preemergency control valve closing subsystem 22.

Referring to FIG. 2 of the drawing, a simplified version of a proportional operational amplifier with lockout provision is shown. This can be employed in any of the subsystems 11–16 although usually it will include other features to be described which make it adaptable for a particular type of subsystem. A high gain DC amplifier 25 of conventional design is connected in circuit so as to be easily disconnectible and removable therefrom as indicated by dotted lines 26. This is usually done by using an integrated module in the form of a removable printed circuit card. The amplifier 25 is connected to act as a simple proportional inverting amplifier by virtue of an input impedance 24 and a feedback impedance 27. A pair of opposed diodes 28, 29 is connected in series with the output of amplifier 25 and feedback resistor 27. A first variable potential current source indicated generally as 30 is connected to a junction 31 between the diodes. The current source comprises a resistor 32, resistor 33, resistor 34, all connected in series between sources of positive and negative voltage. A rheostat 35 is connected from a junction 36 between resistors 33 and 34 to ground or common.

A second variable potential current source, indicated generally as 37 is connected to a junction 38 on the opposite side of diode 29. Current source 37 comprises a voltage divider 39 connected between the positive voltage source and ground and having a movable tap connected in series with a resistor 40 and junction 38. The positive output voltage from the amplifier to the load appears on a lead 41 also connected to the junction 38.

The operation of the amplifier in FIG. 2 is as follows. Under normal operation, with the mode control rheostat 35 in the position shown, the amplifier operates as a proportional inverting amplifier, i.e., a positive output voltage appears on lead 41 which is proportional to the negative input voltage applied to input impedance 24. The values of the resistors 32, 33, 34, 35 are selected such that the voltage at junction 31 will be positive, less positive than that at junction 38 or the output from amplifier 25, so as not to backbias either diode 28 or 29. The setting on voltage divider 39 is at a higher positive voltage than junction 38. Current flow is as indicated by the arrows under the normal operation.

In order to perform lockout of the circuit, the mode control knob on rheostat 35 is moved so as to ground junction 36. The voltage at junction 31 therefore shifts to a higher positive value than the voltage at junction 38. This causes diode 29 to be biased in the reverse direction. The amplifier 25 goes into saturation and is no longer operative to control the voltage on lead 41.

The control of the output voltage on lead 41 is thereby shifted to the second current source 37 as selected by the limit control knob for voltage divider 39. This can be moved up or down to manually vary the output on lead 41. The amplifier 25 or any circuits providing voltage to input impedance 24 may be disconnected and removed, maintained and replaced with sole control of the device now under the dictates of limit control knob position.

It will be observed that diode 29 is connected in the feedback path from output to input of the high gain amplifier 25 in a reversed polarity connection, i.e., in a manner which opposes the normal flow of current from the amplifier for this particular arrangement. However, the fact that there is a variable potential current source 37 connected to junction 38 and a variable potential current source 30 connected to junction 31 means that under normal operation there is provision for keeping diode 29 forward biased (as between voltages on junctions 38, 31) so that current flow can take place through diode 29 as indicated. Then, by raising the voltage at junction 31 through grounding of junction 36 with the mode control knob, the diode 29 is blocked, the amplifier current balance is upset, the voltage at junction 38 is re-established by current source 37, and sole control over the voltage at junction 38 to the output device is shifted to the limit control knob. The purpose of diode 28 is to block the unwanted flow of current from junction 31 into amplifier 25.

In FIG. 3, an amplifier is shown which incorporates the additional feature of preemergency overspeed protection through further manipulation of voltage at junction 38 as will be explained. This additional provision would normally be employed with amplifiers indicated in subsystem 16 of FIG. 1. The parts having the same function as in FIG. 2 have been given the same reference numerals.

A number of input impedances 42 are indicated. This causes the amplifier 25 to act as a summer, although this fact is not material to the present invention. Thus the amplifier can serve as amplifier V2 or V3 in the flow control subsystem 16 of FIG. 1. Connected between the tap of voltage divider 39 and resistor 40 are an additional resistor 43 and rheostat 44. Between 43 and 44 is a shunt circuit path comprising diode 45 and relay contacts 46 connected in series. Means which are not material to the present invention are provided to close contact 46 when the turbine reaches a predetermined overspeed condition. This can be a differential relay receiving a speed signal from the speed/load control subsystem, or it can be a mechanically tripped relay. A resistor 48 connected from output lead 41 to a negative voltage source completes the additional circuit elements required.

The operation of the FIG. 3 arrangement is as follows. The variable potential current source 30 operates as described previously. Manipulation of the mode control 35 will cause blocking of diode 29 and shift control of the output voltage on lead 41 to the limit control 39.

The additional feature of FIG. 3 lies in the provision for reducing the voltage at junction 38 (rather than increasing the voltage at junction 31) so that the diode 29 is also blocked in the event of overspeed. To accomplish this, relay breaker 47 closes on overspeed and provides a shunt path to ground for the current from voltage divider 39. The values of resistors 40, 48, rheostat 44 are such that the voltage imposed on junction 38 will be less positive than that at junction 31 when the breaker 47 closes. This blocks diode 29. The voltage at 38 is slightly negative because of the resistor 48 connected to a negative source.

The slightly negative output signal on lead 41 assures the existence of a control valve "fully closed" control signal. Thus, overspeed protection exists whether amplifier 25 and associated circuitry are being serviced or not.

In FIG. 4 is shown an arrangement suitable for an amplifier positioning two output devices such as amplifier V1 which actuates two steam valves V1 upper and V1 lower shown in FIG. 1. The lockout arrangement provides for isolation and removal of the control circuits associated with input elements 42 or amplifier 25 as before. However, there is the additional feature that the two output devices can be controlled separately during the manual or lockout mode. Valve closing breaker 47 will close both valves regardless of their positions in the manual control mode.

The variable potential source 30 is relocated in a slightly different manner with the elements numbered as before. An additional current source 37a is provided in circuit symmetry with source 37, comprising a voltage divider 39a, a rheostat 44a, and a diode 29a connected in series to junction 31. A shunt diode 45a is connected in symmetrical manner with diode 45 through the overspeed trip contacts 46 to ground. An output lead 41a is connected to a junction 38a in symmetrical relationship to analogous elements 38, 41.

The operation is essentially the same as previously described. When the mode control knob for the current source 30 is in normal position, amplifier 25 controls the voltage at both of the output junctions 38, 38a to the two output devices via leads 41, 41a so that they are controlled in unison. Diodes 29, 29a are conducting. When the mode control knob is moved to the lower position, diodes 29, 29a are both blocked and the voltages at junctions 38, 38a are as selected individually by the two limit control knobs setting the voltages on voltage dividers 39, 39a. These may be operated independently to control the output signals on leads 41, 41a respectively.

Actuation of the overspeed trip 47 effectively reduces the voltages at 38, 38a to the same slightly negative value as before which is sufficient to close the valves. The opposed connections of diodes 45, 45a permit the use of only one contact breaker 47. This is so whether or not diodes 29, 29a have been conducting or not prior to the tripping signal.

In FIG. 5, two amplifiers are shown connected to a common output lead. These are shown in greatly simplified versions but illustrate how they might be employed in the exhaust pressure subsystem 12 and speed/load control subsystem 13 of FIG. 1. The lower amplifier with lockout circuit is essentially as shown in FIG. 2, with the exception that the polarities of input signals and variable potential current sources are reversed and the diodes 28, 29 connected accordingly. The reference numerals are the same as FIG. 2.

A second DC amplifier 25a is connected with a special input and feedback impedance circuit to cause it to act as a proportional plus integral amplifier with partial or full reset. An input resistor 50 is connected to a voltage divider comprising resistor 51, potentiometer 52, resistor 53 connected in series to ground. The tap on potentiometer 52 is connected through a resistor 54 to the summing node 55 of the amplifier. A parallel-connected capacitor 56 forms another path to node 55. The amplifier 25a has a capacitor 57 in the feedback path to cause it to act as an integrator. A second feedback path includes resistors 58, 59 and a shunt path to ground via adjustable rheostat 60.

The operation of the foregoing second amplifier circuit associated with amplifier 25a is more fully described in my U.S. Pat. 3,342,195 issued Sept. 19, 1967. It will provide an output voltage at a node 61 which is a desired transient function of the input voltage applied to resistor 50.

Diodes 62, 63 are connected in opposed fashion on either side of node 61. A variable potential current source is also connected to node 61 comprising a voltage divider 64 connected to a positive voltage source with adjustable tap in turn connected to resistor 65 and resistor 66 in series to a negative voltage source. Node 61 is connected to the junction between resistors 65, 66. The cathode side of diode 63 is connected to an output lead 67. Leads 41, 67 are connected together and lead to the controlled device in the flow control subsystem.

Diode 63 acts, when conducting, to cause the voltage on lead 67 to limit the output from the lower amplifier by blocking diode 29. Thus, if the upper amplifier is receiving a signal proportional to steam exhaust pressure and the knob for voltage divider 64 is in the upper position so that diode 63 is conducting, exhaust pressure requirements will control the operation of the turbine as opposed to speed/load requirements from the lower amplifier. The injection of current via diode 63 controls the voltage at 38, causing diode 29 to become back-biased as before. When the knob for voltage divider 64 is moved to the lower position, diode 63 is blocked by virtue of the fact that the voltage at junction 61 is now more negative than the negative voltage on lead 67. Thus, the lower amplifier is in control. It should be noted that the current source 37 for the lower amplifier also acts as a current source for the upper amplifier.

Thus, it can be seen that the two opposed diodes and two variable potential current sources can be connected in an operational amplifier circuit to provide an extremely flexible and varied type of control in the overall system described. The amplifier output therefore can be controlled with alternate modes of control as desired while the amplifier or associated circuitry is removed for maintenance or servicing. A second alternate mode of control can be supplied as in FIG. 3 to cause a varied operation of the output device if a condition such as overspeed occurs during maintenance. FIG. 4 illustrates how one amplifier can control two output devices which, when in the lockout mode, can be individually controlled and which also includes the emergency mode of control if a selected condition occurs while the amplifier is removed. FIG. 5 illustrates how two amplifiers can be connected in limiting mode to achieve flexible individual or dual control over a single output device.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. In a control system of the type having high gain DC operational amplifier means connected to receive at least one input signal for normally controlling at least one output device, the combination of:
    a first diode connected between the output of said amplifier and a first junction,
    a second diode connected between said first junction and a second junction in opposed fashion to said first diode and in a manner to oppose passage of current from the amplifier to said second junction,
    output means responsive to the potential on said second junction,
    a first variable potential current source connected to said first junction with means to adjust the first junction potential, and
    a second variable potential current source connected to said second junction having means to vary the second junction potential, whereby said second diode is forward or backward biased according to the relative potentials of the first and second junctions.

2. The combination according to claim 1, wherein a feedback impedance is also connected between said second junction and the amplifier input, whereby backward biasing of said second diode shifts control of the potential on the second junction from the amplifier to the second current source.

3. The combination according to claim 1, wherein said second current source includes first means for selectively varying the potential on the second junction and second means for abruptly changing the potential on the second junction to a predetermined value upon occurrence of a predetermined condition.

4. The combination according to claim 1, including a third diode connected between said first junction and a third junction in a manner to oppose both the first and second diodes, said third junction being connected to second output means responsive to the potential on the third junction, third variable potential current source connected to said third junction, whereby said first and second output means can be separately and respectively controlled by the second and third current sources when the second and third diodes are back-biased.

5. The combination according to claim 1, wherein there are two of said amplifiers as described, wherein the first junction of the first amplifier is connected via feedback impedance means to the input of the first amplifier, wherein the second junction of the second amplifier is connected via feedback impedance means to the input of the second amplifier, and wherein the second junctions of the first and second amplifiers are connected together and to a single controlled output means, whereby the second amplifier output may serve as said second variable potential current source for the first amplifier.

References Cited

UNITED STATES PATENTS 3,425,401   2/1969   Lang _____ 317—5 X

NATHAN KAUFMAN, Primary Examiner

U.S. Cl. X.R.

330—1, 24, 75, 84, 124, 147, 199